United States Patent
Chai et al.

(10) Patent No.: US 11,583,798 B2
(45) Date of Patent: Feb. 21, 2023

(54) INTENSIFIED PRESSURE SWING ADSORPTION SYSTEM AND PROCESS CYCLES

(71) Applicants: Siew Wah Chai, Kenmore, NY (US); Yang Luo, Amherst, NY (US)

(72) Inventors: Siew Wah Chai, Kenmore, NY (US); Yang Luo, Amherst, NY (US)

(73) Assignee: PRAXAIR TECHNOLOGY, INC., Danbury, CT (US)

(*) Notice: Subject to any disclaimer, the term of this patent is extended or adjusted under 35 U.S.C. 154(b) by 141 days.

(21) Appl. No.: 17/087,886

(22) Filed: Nov. 3, 2020

(65) Prior Publication Data

US 2021/0187432 A1    Jun. 24, 2021

Related U.S. Application Data

(60) Provisional application No. 62/949,745, filed on Dec. 18, 2019.

(51) Int. Cl.
*B01D 53/047* (2006.01)
*B01D 53/04* (2006.01)

(52) U.S. Cl.
CPC ....... *B01D 53/047* (2013.01); *B01D 53/0462* (2013.01); *B01D 2253/102* (2013.01); *B01D 2253/104* (2013.01); *B01D 2253/108* (2013.01); *B01D 2256/16* (2013.01)

(58) Field of Classification Search
CPC .............. B01D 53/0462; B01D 53/047; B01D 53/0473; B01D 2256/16; B01D 2259/41; B01D 53/02; B01D 53/04; B01D 53/0446; B01D 53/0476; B01D 53/261; B01J 20/06; B01J 20/103; B01J 20/26; C07C 7/12
See application file for complete search history.

(56) References Cited

U.S. PATENT DOCUMENTS

| | | | |
|---|---|---|---|
| 6,210,466 B1 | 4/2001 | Whysall et al. | |
| 6,379,431 B1 | 4/2002 | Xu et al. | |
| 6,454,838 B1 | 9/2002 | Xu et al. | |
| 6,565,628 B2 * | 5/2003 | Xu ...................... | B01D 53/047 95/143 |
| 7,276,107 B2 | 10/2007 | Baksh et al. | |
| 7,390,350 B2 | 6/2008 | Weist, Jr. et al. | |
| 8,435,328 B2 | 5/2013 | Baksh et al. | |
| 8,551,217 B2 | 10/2013 | Baksh et al. | |
| 9,381,460 B2 | 7/2016 | Weist, Jr. et al. | |
| 9,669,348 B2 | 6/2017 | Renou et al. | |
| 2010/0011955 A1 * | 1/2010 | Hufton .................. | C01B 3/32 96/140 |
| 2012/0174776 A1 | 7/2012 | Baksh | |

* cited by examiner

*Primary Examiner* — Sharon Pregler
(74) *Attorney, Agent, or Firm* — Iurie A. Schwartz

(57) ABSTRACT

The present invention relates to an intensified 5-bed and 6-bed PSA process cycles features, as well as fast rate adsorbents that enable the intensified PSA system to meet cost and performance target are identified. The proposed capital efficient $H_2$PSA system offers opportunity to reduce PSA capital expenditure by ten percent (10%).

20 Claims, 2 Drawing Sheets

Model results for 6-bed SMR $H_2$PSA processes, with pilot validated performance for 6-1-3 (P/F=1) and 6-1-2 (P/F>1) cycles.

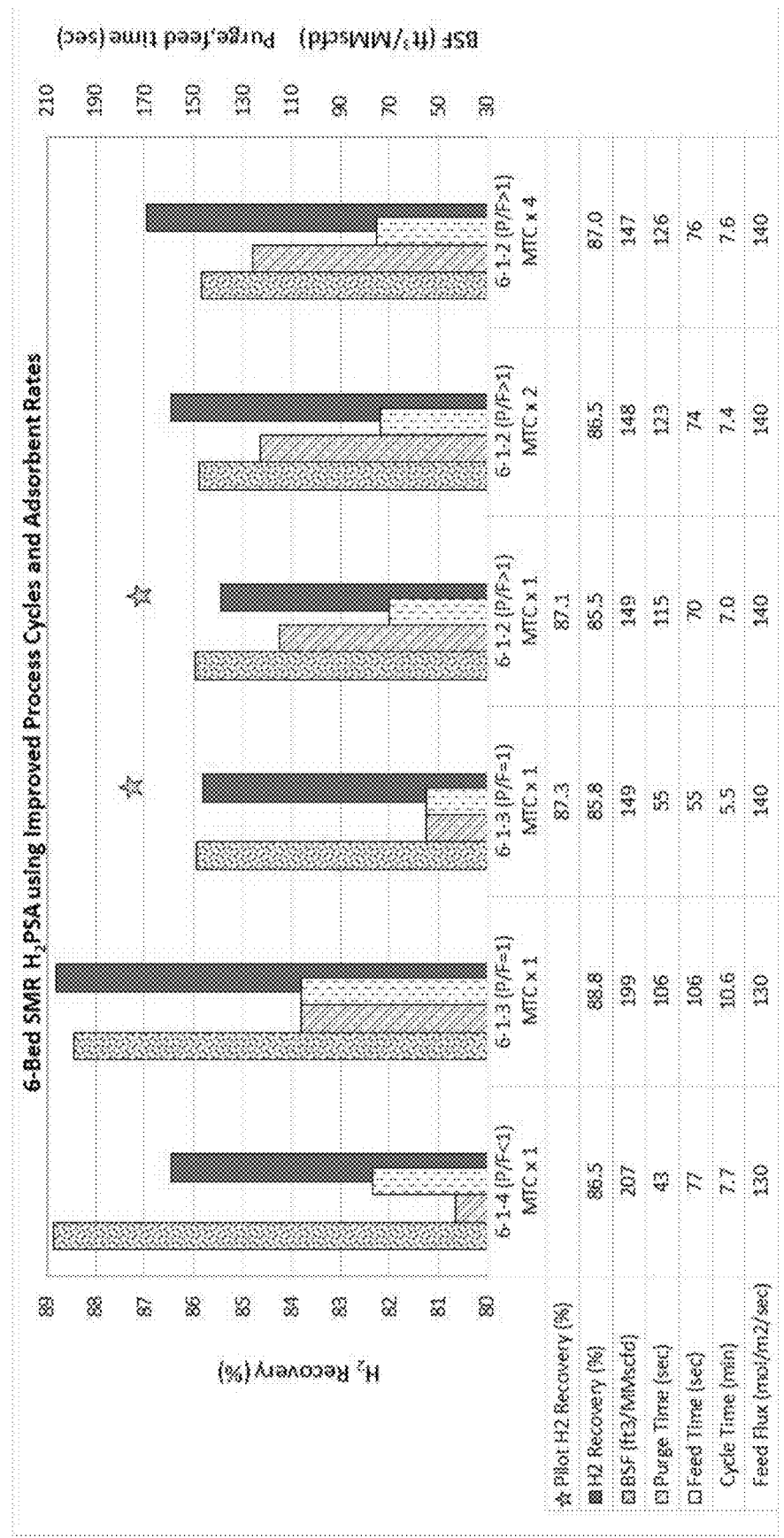
Figure 1: Model results for 6-bed SMR H₂PSA processes, with pilot validated performance for 6-1-3 (P/F=1) and 6-1-2 (P/F>1) cycles.

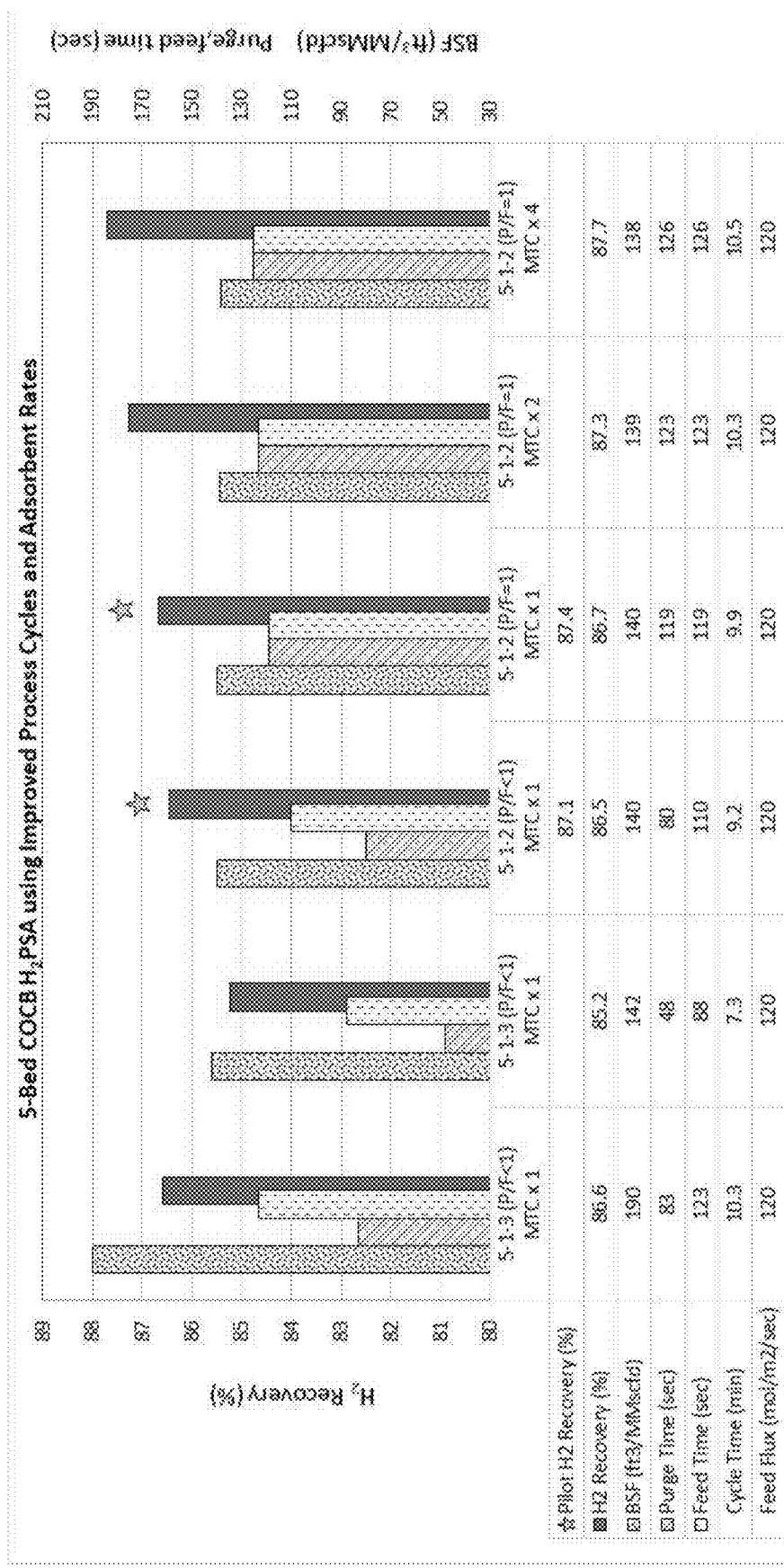
Figure 2: Model results for 5-bed CO coldbox $H_2$PSA processes, with pilot validated performance for 5-1-2 (P/F<1) and 5-1-2 (P/F=1) cycles.

INTENSIFIED PRESSURE SWING ADSORPTION SYSTEM AND PROCESS CYCLES

RELATED APPLICATION

The present application claims priority from U.S. Provisional Application Ser. No. 62/949,745, filed Dec. 18, 2019, which is incorporated by reference herein in its entirety.

FIELD OF THE INVENTION

The present invention proposes a capital efficient hydrogen ($H_2$) pressure swing adsorption (PSA) system and processes to achieve up to thirty percent (30%) adsorption bed size factor reduction while meeting the $H_2$ recovery performance. Specifically, the intensified 5-bed and 6-bed PSA process cycles features, and fast rate adsorbents enable the intensified PSA system to meet cost and performance target are identified. The proposed capital efficient $H_2$PSA system offers opportunity to reduce PSA capital expenditure by ten percent (10%).

BACKGROUND OF THE INVENTION

The need for high purity gasses, such as hydrogen, processed from effluents in the chemical process industries remain. These effluents are hydrogen containing feed mixtures gases (i.e., synthesis gases), from the likes of steam methane reforming of natural gas or naptha, catalytic reforming of hydrocarbons, isomerization processes, etc, which are routed to a PSA for further processing. This growing demand requires the need to develop highly efficient separation processes (e.g., PSA) for hydrogen ($H_2$) production from various feed mixtures. In order to obtain highly efficient PSA separation processes, both the capital and operating costs of the PSA system must be reduced. $H_2$PSA system design needs to consider process cycle, adsorbent rate, capacity, and cycle time to maximize performance, reduce system size, and achieve the lowest overall system cost. As we strive to shrink the $H_2$PSA size and run faster cycles, desorption rates of stronger adsorbing contaminants often become limiting factors which result in significant process performance drop off. In addition, short cycle time and high flow velocity pose fluidization risk on the adsorbent beds. Small to medium size PSA systems tend to have lower number of adsorbent vessels compared to the larger PSA, therefore, process cycle optimization is limited and it is often challenging to achieve the desired recovery performance when the system desires smaller adsorbent amount and shorter cycles.

Conventional PSA systems are well known for separating feed mixture gases which contain components with different adsorption characteristics. For example, in a typical PSA system, a multicomponent gas mixture is passed to at least one of multiple adsorption beds at an elevated pressure to adsorb at least one strongly sorbed component while at least one component passes through. In the case of hydrogen PSA, hydrogen is the weakest adsorbed component which passes through the bed. At a defined time, the feed step is discontinued and the adsorption bed is co-currently depressurized in one or more steps, counter-currently blown down in one or more steps, counter-currently purged in one or more steps and counter- or co-currently repressurized in one or more steps. Cycle steps and times must be appropriately executed to permit essentially pure hydrogen product to exit the bed with a high recovery. The sequence of steps is not limited to the one stated above and a combination of two or more steps can be employed as a single step as well.

U.S. Pat. No. 6,210,466 to Whysall et al disclosed a PSA process for very large gas processing units (>100 MMSCFD capacity) in a single train of equipment to overcome physical limitations of vessel size and adsorbent crush strength without giving up overall performance. It teaches utilizing one bed to provide purge to multiple beds. Therefore, total purge can be extended to more than adsorption time to ensure the sufficient time for desorption. This document covers large PSA system of 10-20 beds to process >100 MMSCFD feed rate.

U.S. Pat. No. 6,379,431 to Xu et al presented a PSA process to increase production and/or recovery per bed in a multiple bed system without increasing the number of beds. A variety of process cycles for up to 10 beds system with four (4) pressure equalization steps and ≥2 beds on purge are disclosed.

U.S. Pat. No. 6,454,838 to Xu et al disclosed two variety of 6-1-4 process cycles having four (4) pressure equalization steps. The proposed process allows continuous waste flow to tail gas drum by introducing overlapping EQ/PPG, EQ/BD, idle steps and an external gas storage tank.

U.S. Pat. No. 6,565,628 to Xu et al disclosed a PSA process with less than 25 sec. pressure equalization time to reduce cycle time and system size. The PSA process covers large system, 12-16 beds. Xu et al. discloses that pressure equalization time is <25 sec and ≥2 beds on purge to address high purge flow in short cycle time, final DP in $EQ_n$ is greater than final DP in $EQ_{n-1}$ to address fluidization risk, optional EQ/PPG and PPG/BD overlapping steps, one PPG bed exclusively supplies to another PG bed, manifolded into group of 4 beds to allow exclusive 1 PPG-1 PG within a group.

U.S. Pat. No. 7,390,350 to Weist Jr et al disclosed a design and operation method for PSA systems characterized by reduced bed depth in feet times a dimensionless ratio of empty bed residence time to feed time, using <1.3 mm adsorbent particle size.

U.S. Pat. No. 8,551,217 to Baksh et al disclosed advanced 6-1-4, 6-2-3, 5-1-3 process cycles and adsorbent layering for enhanced PSA recovery. Adsorbent layering includes alumina, carbon and zeolite, subdivide carbon to two layers (0.5-1.5 mm and 2-3 mm) to remove $CO_2$ and then $CH_4$, subdivide zeolite to two layers (0.5-2 mm and 2-3 mm) to remove CO and then $N_2$.

U.S. Pat. No. 8,435,328 to Baksh et al disclosed advanced 10-bed PSA cycle and adsorbent layering capable of achieving the same recovery as conventional 12-bed PSA for 100 MMSCFD feed. Various turn down and bed drop cycles with enhanced recovery were also disclosed.

U.S. Pat. No. 9,381,460 by Weist Jr. et al disclosed PSA process cycles for 12-bed system having five (5) pressure equalization steps and a variety of combination such as F/EQ1, EQ1'/PP, EQ'/PP, EQ'/FP, EQ5/PPG, idle step between EQ5 and PPG or PPG/BD for enhanced PSA performance.

U.S. Pat. No. 9,669,348 to Renou et al discloses a PSA process that only has one active step per phase time to provide operational reliability and performance. It requires using ≥7 adsorber for at least 7 distinct elementary steps, with each adsorber n follows the pressure cycle with an offset of one phase time with respect to the pressure cycle of the adsorber n−1.

Based on the related art, significant amount of PSA process and cycle development have focused on large PSA systems with up to 16 parallel adsorption vessels. These large systems tend to employ as many as pressure equalization steps to maximize recovery performance, since the conventional wisdom in PSA design is that more pressure equalization steps equal to higher recovery. However, the increase pressure equalization steps come with the increase capital cost due to additional beds, equalization headers as well as valves. Thus, the newly proposed small PSA systems and processes (5 or 6 beds) are capital efficient through a thirty percent (30%) bed size factor reduction without losing hydrogen recovery performance.

SUMMARY OF THE INVENTION

According to one aspect of the invention, a pressure swing adsorption process for producing a gas stream enriched with compound X from a feed gas stream using 5 or 6 adsorbent vessels based pressure swing adsorption system is provided. The pressure swing adsorption (PSA) system carries out an efficient process cycle having two pressure equalization steps, no idle step, each pressure equalization and blowdown step being ≥25 seconds, wherein the critical provide purge gas step is positioned to allow the longest purge time, and the first provide purge gas is positioned to provide the last purge step for the receiving bed for a clean rinse.

According to another aspect of the invention, a pressure swing adsorption process for separating a pressurized supply feed gas containing one or more strongly adsorbable component from at least one less strongly adsorbable product gas component in a six bed adsorption system to produce a continuous stream of product gas enriched in the less strongly adsorbable component and a stream of offgas that is enriched in the strongly adsorbable components. The process is carried out in accordance with to the following cycle chart:

BRIEF DESCRIPTION OF THE FIGURES

The objects and advantages of the invention will be better understood from the following detailed description of the preferred embodiments thereof in connection with the accompanying figures wherein:

FIG. 1 illustrates the results for 6-bed SMR $H_2$PSA processes, with pilot validated performance for 6-1-3 (P/F=1) and 6-1-2 (P/F>1) cycles; and FIG. 2 depicts the results for 5-bed CO coldbox $H_2$PSA processes, with pilot validated performance for 5-1-2 (P/F<1) and 5-1-2 (P/F=1) cycles.

DETAILED DESCRIPTION OF THE INVENTION

The invention provides a pressure swing adsorption process for the separation of a pressurized feed gas supply containing one or more strongly adsorbable components and at least one less strongly adsorbable product gas in a multiple bed system. The feed gas is supplied to a feed end of an adsorbent bed containing solid adsorbent material(s), which preferentially adsorbs the more strongly adsorbable component(s) and withdrawing the least strongly adsorbable product component from an exit end of the adsorber bed, producing in cycle including steps in which the continuous feed gas sequentially co-currently flows through each of the adsorber beds to produce gas product using continuous feed gas, pressurization steps, pressure equalization steps, blowdown step(s), and purge step(s).

The novel PSA cycles of the present invention will now be described with reference to various embodiments. In one embodiment of the invention, the novel PSA system employs an eighteen step, six adsorbent bed PSA cycle having two equalization steps, and one bed on feed (referred herein as "the 6-1-2 PSA cycle"). This 6-1-2 PSA cycle has

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| B1 | A1 | A2 | A3 | E1 | PPG1 | E2/PPG2 | PPG3 | PPG4 | BD | Pg3a | Pg4 | Pg2 | Pg3b | Pg1 | E2' | E1' | PP1 | PP2 |
| B2 | E1' | PP1 | PP2 | A1 | A2 | A3 | E1 | PPG1 | E2/PPG2 | PPG3 | PPG4 | BD | Pg3a | Pg4 | Pg2 | Pg3b | Pg1 | E2' |
| B3 | Pg3b | Pg1 | E2' | E1' | PP1 | PP2 | A1 | A2 | A3 | E1 | PPG1 | E2/PPG2 | PPG3 | PPG4 | BD | Pg3a | Pg4 | Pg2 |
| B4 | Pg3a | Pg4 | Pg2 | Pg3b | Pg1 | E2' | E1' | PP1 | PP2 | A1 | A2 | A3 | E1 | PPG1 | E2/PPG2 | PPG3 | PPG4 | BD |
| B5 | PPG3 | PPG4 | BD | Pg3a | Pg4 | Pg2 | Pg3b | Pg1 | E2' | E1' | PP1 | PP2 | A1 | A2 | A3 | E1 | PPG1 | E2/PPG2 |
| B6 | E1 | PPG1 | E2/PPG2 | PPG3 | PPG4 | BD | Pg3a | Pg4 | Pg2 | Pg3b | Pg1 | E2' | E1' | PP1 | PP2 | A1 | A2 | A3 | where:
A1 = First Adsorption Step
A2 = Second Adsorption Step
A3 = Third Adsorption Step
E1 = First Equalization Down Step
PPG1 = First Provide Purge Gas Step
E2/PPG2 = Second Equalization Down/Second Provide Purge Gas Overlapping Step
PPG3 = Third Provide Purge Gas Step
PPG4 = Fourth Provide Purge Gas Step
BD = Blowdown Step
Pg3a = Third (a) Receive Purge Gas Step
Pg4 = Fourth Receive Purge Gas Step
Pg2 = Second Receive Purge Gas Step
Pg3b = Third (b) Receive Purge Gas Step
Pg1 = First Receive Purge Gas Step
E2' = Second Equalization Up Step
E1' = First Equalization Up Step
PP1 = First Product Pressurization Step
PP2 = Second Product Pressurization Step one (1) less pressure equalization steps designed to achieve the better and or equivalent performance to the conventional 6-1-4 or 6-1-3 PSA cycles in which more pressure equalization steps are given. Thus, rather than utilizing an extra pressure equalization step, additional time is provided for pressure equalization, blowdown, and purge steps for improved operational reliability and process performance. Furthermore, each pressure equalization step reduced provides two extra steps for optimizing cycle steps arrangement. In general, it is preferred that all equalization down steps are completed before commencing provide purge gas steps to achieve better gas concentration fronts within the pressurized bed. Under certain conditions, as provided by the current invention, a provide purge gas step inserted in between two equalization down steps can be advantageous for eliminating the hold or idle step in the process, and for providing the cleanest purge gas as a final boost of purge for the receiving bed. This intercepting provide purge gas step is configured for a short duration and with small pressure change to maintain the desired pressure levels for the following equalization steps. On the other hand, a process becomes inefficient when a redundant or unproductive step is coupled with another critical step within the same time step, for examples, E2b is coupled to E4 (Table 3, 6-1-4 cycle), Hold is coupled to E3 (Table 4, 6-1-3 cycle). The present invention provides processes with coupled critical steps, and or decoupled redundant and critical steps, in order to satisfy minimum operational and reliability requirements, before stretching PSA performance by freely adjusting the critical provide purge step that has the potential of providing the longest purge time (for example in Table 1, PPG3 provides for Pg3a and Pg3b). Judicious step time allocation is necessary to optimize PSA working capacity, mitigate fluidization risk, and facilitate cycle time adjustment versus plant rate. Specifically, pressure equalization step ≥25 sec, blowdown step ≥25 sec, receive purge gas steps comprised of combination of critical and less critical steps with duplicate purge steps to maximize purge duration.

With reference to Tables 1-2, the embodiment of a preferred cycle is that of the 6-1-2 PSA cycle with 18 steps, and a more preferred cycle of the 6-1-2 PSA cycle with 12 steps, shown in Table 2. The latter has been validated to produce equivalent process performance to that of 6-1-2 PSA cycle in Table 1.

TABLE 1

6-1-2 cycle - Proposed Advanced cycle

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| B1 | A1 | A2 | A3 | E1 | PPG1 | E2/PPG2 | PPG3 | PPG4 | BD | Pg3a | Pg4 | Pg2 | Pg3b | Pg1 | E2' | E1' | PP1 | PP2 |
| B2 | E1' | PP1 | PP2 | A1 | A2 | A3 | E1 | PPG1 | E2/PPG2 | PPG3 | PPG4 | BD | Pg3a | Pg4 | Pg2 | Pg3b | Pg1 | E2' |
| B3 | Pg3b | Pg1 | E2' | E1' | PP1 | PP2 | A1 | A2 | A3 | E1 | PPG1 | E2/PPG2 | PPG3 | PPG4 | BD | Pg3a | Pg4 | Pg2 |
| B4 | Pg3a | Pg4 | Pg2 | Pg3b | Pg1 | E2' | E1' | PP1 | PP2 | A1 | A2 | A3 | E1 | PPG1 | E2/PPG2 | PPG3 | PPG4 | BD |
| B5 | PPG3 | PPG4 | BD | Pg3a | Pg4 | Pg2 | Pg3b | Pg1 | E2' | E1' | PP1 | PP2 | A1 | A2 | A3 | E1 | PPG1 | E2/PPG2 |
| B6 | E1 | PPG1 | E2/PPG2 | PPG3 | PPG4 | BD | Pg3a | Pg4 | Pg2 | Pg3b | Pg1 | E2' | E1' | PP1 | PP2 | A1 | A2 | A3 | where:
A1 = First Adsorption Step
A2 = Second Adsorption Step
A3 = Third Adsorption Step
E1 = First Equalization Down Step
PPG1 = First Provide Purge Gas Step
E2/PPG2 = Second Equalization Down/Second Provide Purge Gas Overlapping Step
PPG3 = Third Provide Purge Gas Step
PPG4 = Fourth Provide Purge Gas Step
BD = Blowdown Step
Pg3a = Third (a) Receive Purge Gas Step
Pg4 = Fourth Receive Purge Gas Step
Pg2 = Second Receive Purge Gas Step
Pg3b = Third (b) Receive Purge Gas Step
Pg1 = First Receive Purge Gas Step
E2' = Second Equalization Up Step
E1' = First Equalization Up Step
PP1 = First Product Pressurization Step
PP2 = Second Product Pressurization Step

TABLE 2

Simplified version of 6-1-2 cycle - Proposed Advanced Cycle

| | 1 | 2 | 3 | 4 | 5 | 6 | 7 | 8 | 9 | 10 | 11 | 12 |
|---|---|---|---|---|---|---|---|---|---|---|---|---|
| B1 | A1 | A2 | E1 | E2/PPG1 | PPG2 | BD | Pg2a | Pg1 | Pg2b | E2' | E1' | PP |
| B2 | E1' | PP | A1 | A2 | E1 | E2/PPG1 | PPG2 | BD | Pg2a | Pg1 | Pg2b | E2' |

TABLE 2-continued

Simplified version of 6-1-2 cycle - Proposed Advanced Cycle

| | 1 | 2 | 3 | 4 | 5 | 6 | 7 | 8 | 9 | 10 | 11 | 12 |
|---|---|---|---|---|---|---|---|---|---|---|---|---|
| B3 | Pg2b | E2' | E1' | PP | A1 | A2 | E1 | E2/PPG1 | PPG2 | BD | Pg2a | Pg1 |
| B4 | Pg2a | Pg1 | Pg2b | E2' | E1' | PP | A1 | A2 | E1 | E2/PPG1 | PPG2 | BD |
| B5 | PPG2 | BD | Pg2a | Pg1 | Pg2b | E2' | E1' | PP | A1 | A2 | E1 | E2/PPG1 |
| B6 | E1 | E2/PPG1 | PPG2 | BD | Pg2a | Pg1 | Pg2b | E2' | E1' | PP | A1 | A2 | where:
A1 = First Adsorption Step
A2 = Second Adsorption Step
E1 = First Equalization Down Step
E2/PPG1 = Second Equalization Down/First Provide Purge Gas Overlapping Step
PPG2 = Second Provide Purge Gas Step
BD = Blowdown Step
Pg2a = Second (a) Receive Purge Gas Step
Pg1 = First Receive Purge Gas Step
Pg2b = Second (b) Receive Purge Gas Step
E2' = Second Equalization Up Step
E1' = First Equalization Up Step
PP = Product Pressurization Step

TABLE 3

6-1-4 cycle (related art)

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| B1 | A1 | A2 | A3 | E1 | E2a | E2b | E3 | PPG | E4/BD1 | BD2 | Pg | E4' | E3' | E2a' | E2b' | E1' | PP1 | PP2 |
| B2 | E1' | PP1 | PP2 | A1 | A2 | A3 | E1 | E2a | E2b | E3 | PPG | E4/BD1 | BD2 | Pg | E4' | E3' | E2a' | E2b' |
| B3 | E3' | E2a' | E2b' | E1' | PP1 | PP2 | A1 | A2 | A3 | E1 | E2a | E2b | E3 | PPG | E4/BD1 | BD2 | Pg | E4' |
| B4 | BD2 | Pg | E4' | E3' | E2a' | E2b' | E1' | PP1 | PP2 | A1 | A2 | A3 | E1 | E2a | E2b | E3 | PPG | E4/BD1 |
| B5 | E3 | PPG | E4/BD1 | BD2 | Pg | E4' | E3' | E2a' | E2b' | E1' | PP1 | PP2 | A1 | A2 | A3 | E1 | E2a | E2b |
| B6 | E1 | E2a | E2b | E3 | PPG | E4/BD1 | BD2 | Pg | E4' | E3' | E2a' | E2b' | E1' | PP1 | PP2 | A1 | A2 | A3 | where:
A1 = First Adsorption Step
A2 = Second Adsorption Step
A3 = Third Adsorption Step
E1 = First Equalization Down Step
E2a = Second (a) Equalization Down Step
E2b = Second (b) Equalization Down Step
E3 = Third Equalization Down Step
PPG = Provide Purge Gas Step
E4/BD1 = Fourth Equalization Down/First Blowdown Overlapping Step
BD2 = Second Blowdown Step
Pg = Receive Purge Gas Step
E4' = Fourth Equalization Up Step
E3' = Third Equalization Up Step
E2a' = Second (a) Equalization Up Step
E2b' = Second (b) Equalization Up Step
E1' = First Equalization Up Step
PP1 = First Product Pressurization Step
PP2 = Second Product Pressurization Step

TABLE 4

6-1-3 zycle (modified related art)

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| B1 | A1 | A2 | A3 | E1 | Hold | E2 | PPG1 | E3/PPG2 | PPG3 | BD | Pg2 | Pg3 | Pg1 | E3' | E2' | E1' | PP1 | PP2 |
| B2 | E1' | PP1 | PP2 | A1 | A2 | A3 | E1 | Hold | E2 | PPG1 | E3/PPG2 | PPG3 | BD | Pg2 | Pg3 | Pg1 | E3' | E2' |

TABLE 4-continued 6-1-3 zycle (modified related art)

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| B3 | Pg1 | E3' | E2' | E1' | PP1 | PP2 | A1 | A2 | A3 | E1 | Hold | E2 | PPG1 | E3/PPG2 | PPG3 | BD | Pg2 | Pg3 |
| B4 | BD | Pg2 | Pg3 | Pg1 | E3' | E2' | E1' | PP1 | PP2 | A1 | A2 | A3 | E1 | Hold | E2 | PPG1 | E3/PPG2 | PPG3 |
| B5 | PPG1 | E3/PPG2 | PPG3 | BD | Pg2 | Pg3 | Pg1 | E3' | E2' | E1' | PP1 | PP2 | A1 | A2 | A3 | E1 | Hold | E2 |
| B6 | E1 | Hold | E2 | PPG1 | E3/PPG2 | PPG3 | BD | Pg2 | Pg3 | Pg1 | E3' | E2' | E1' | PP1 | PP2 | A1 | A2 | A3 | where:
A1 = First Adsorption Step
A2 = Second Adsorption Step
A3 = Third Adsorption Step
E1 = First Equalization Down Step
Hold = Hold step
E2 = Second Equalization Down Step
PPG1 = First Provide Purge Gas Step
E3/PPG2 = Third Equalization Down/Second Provide Purge Gas Overlapping Step
PPG3 = Third Provide Purge Gas Step
BD = Blowdown Step
Pg2 = Second Receive Purge Gas Step
Pg3 = Third Receive Purge Gas Step
Pg1 = First Receive Purge Gas Step
E3' = Third Equalization Up Step
E2' = Second Equalization Up Step
E1' = First Equalization Up Step
PP1 = First Product Pressurization Step
PP2 = Second Product Pressurization Step The performance characteristic of these cycles compared to those of the related art 6-1-4 and 6-1-3 PSA cycles in Tables 3-4, respectively. Performance comparison for 6-1-4, 6-1-3 and 6-1-2 cycles illustrated using a steam methane reformer (SMR) feed are shown below, in Tables 5-6. Table 5 illustrates the difference in an example of 6-bed PSA cycle performance comparison for using 4 and 3 pressure equalization steps.

TABLE 5

Example 1. 6-bed PSA cycles with 4 and 3 pressure equalization steps

| SMR Feed Compositions | 74.6% $H_2$, 16.5% $CO_2$, 3.7% CO, 4.5% $CH_4$, <1% $N_2$, $H_2O$ | |
|---|---|---|
| Process Cycle | 6-1-4 (related art) | 6-1-3 (modified related art) |
| $H_2$ Recovery (%) | 86.5 | 88.8 |
| BSF (ft$^3$/MMscfd) | 207 | 199 |
| Feed Flux (mol/m$^2$/sec) | 130 | 130 |
| Purge Time (sec) | 43 | 106 |
| Feed Time (sec) | 77 | 106 |
| Cycle Time (min) | 7.7 | 10.6 |

As shown in Example 1 (Table 5, above) the 6-1-4 PSA cycle with 4 equalization steps significantly underperforms in terms of hydrogen recovery as compared to the 6-1-3 PSA cycle. This is contrary to conventional pressure swing adsorption of more pressure equalization steps enhancing recovery. Further, as shown in Example 2 (Table 6, below) another simulation was conducted where for the SMR feed, a 6-1-3 PSA cycle was run and compared to a 6-1-2 PSA cycle where the number of equalizations has been stepped down from 3 to 2, and was run at higher feed flux and much lower Bed Size Factor (but equivalent for purposes of comparison). It will be understood by those skilled in the art that the term "Bed Size Factor" or "BSF" as utilized herein refers to the amount of adsorbent per MMSCFD $H_2$ produced. This is generally understood to be a measure of the PSA size and indirect indication of the relative PSA cost. Thus, a smaller BSF number is preferred as it corresponds to the less amount of adsorbent needed to produce target amount of hydrogen product.

TABLE 6

Example 2. 6-bed PSA cycles with 3 and 2 pressure equalization steps

| SMR Feed Compositions | 74.6% $H_2$, 16.5% $CO_2$, 3.7% CO, 4.5% $CH_4$, <1% $N_2$, $H_2O$ | |
|---|---|---|
| Process Cycle | 6-1-3 (modified related art) | 6-1-2 (invention) |
| $H_2$ Recovery (%) | 85.8 | 85.5 |
| BSF (ft$^3$/MMscfd) | 149 | 149 |
| Feed Flux (mol/m$^2$/sec) | 140 | 140 |
| Purge Time (sec) | 55 | 115 |
| Feed Time (sec) | 55 | 70 |
| Cycle Time (min) | 5.5 | 7.0 |

As can be seen from this Example 2, the hydrogen recovery is virtually same though with one less pressure equalization steps. The newly designed 6-1-2 PSA cycle has a purge time that is longer than the one for the 6-1-3 PSA cycle, and the purge time has a more significant impact than the number of pressure equalization steps when absorber bed size is reduced and adsorbents mass transfer rates are rather limited. For intensified PSA process with short cycle time of the present invention, reducing pressure equalization steps allow for more purge time, which is essential to achieve the desired recovery performance.

An additional benefit of the present 6-1-2 PSA cycle in that the reduced pressure equalization steps is that it allows one to design longer equalization time which helps to mitigate fluidization risk during the pressure equalization steps. Fluidization risk increases as flow rates of the depressurizing gas are increased to complete the pressure equalization steps within shorter step times in an intensified PSA system. Reducing each pressure equalization step makes available two extra step times that can be used to address critical process needs such as relaxing equalization times to prevent gas flow velocity from exceeding the minimum fluidization velocity.

During the operation of a plant employing a six bed PSA process cycle it may be desirable to operate the plant in the turndown mode for a limited period of time. In the case of a six bed/vessel PSA system, this mode enables the continuous production with only five vessels online while one of the beds or valves associated with a given bed failed and need to be serviced. On the other hand, a five bed PSA system may be adopted over six bed PSA system for lower production demand or for lower cost option. Whatever the circumstances may be (for turndown or normal operations) the plant from a capital efficiency point of view, smaller BSF, less number of vessels, valves and instrumentation are desirable, since all of them offers opportunity to reduce cost.

The newly designed advanced 5-1-2 PSA cycle with 2 pressure equalization steps achieves better performance than 5-1-3 PSA cycle with 3 pressure equalization steps. Instead of extra pressure equalization step, additional time is allowed for pressure equalization, blow down, and purge steps for improved operational reliability and process performance. In addition, an intercepting provide purge gas step is introduced in between two equalization down steps to eliminate the redundant step and to provide the cleanest purge gas as a final boost of purge for the receiving bed. The cycle step is further configured to satisfy pressure equalization step ≥25 sec, blowdown step ≥25 sec, a freely adjustable provide purge step for stretching PSA performance and receive purge gas steps comprised of combination critical and less critical steps to maximize purge duration. PSA cycle charts are summarized in Tables 7 and 8.

TABLE 7

5-1-2 cycle - Proposed Advanced Cycle

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| B1 | A1 | A2 | A3 | E1 | PPG1 | E2/PPG2 | PPG3 | BD | Pg2 | Pg3 | Pg1 | E2' | E1' | PP1 | PP2 |
| B2 | E1' | PP1 | PP2 | A1 | A2 | A3 | E1 | PPG1 | E2/PPG2 | PPG3 | BD | Pg2 | Pg3 | Pg1 | E2' |
| B3 | Pg3 | Pg1 | E2' | E1' | PP1 | PP2 | A1 | A2 | A3 | E1 | PPG1 | E2/PPG2 | PPG3 | BD | Pg2 |
| B4 | PPG3 | BD | Pg2 | Pg3 | Pg1 | E2' | E1' | PP1 | PP2 | A1 | A2 | A3 | E1 | PPG1 | E2/PPG2 |
| B5 | E1 | PPG1 | E2/PPG2 | PPG3 | BD | Pg2 | Pg3 | Pg1 | E2' | E1' | PP1 | PP2 | A1 | A2 | A3 | where:
A1 = First Adsorption Step
A2 = Second Adsorption Step
A3 = Third Adsorption Step
E1 = First Equalization Down Step
PPG1 = First Provide Purge Gas Step
E2/PPG2 = Second Equalization Down/Second Provide Purge Gas Overlapping Step
PPG3 = Third Provide Purge Gas Step
BD = Blowdown Step
Pg2 = Second Receive Purge Gas Step
Pg3 = Third Receive Purge Gas Step
Pg1 = First Receive Purge Gas Step
E2' = Second Equalization Up Step
E1' = First Equalization Up Step
PP1 = First Product Pressurization Step
PP2 = Second Product Pressurization Step

TABLE 8

5-1-3 cycle (related art)

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| B1 | A1 | A2 | A3 | E1a | E1b | E2 | PPG | E3/BD1 | BD2 | PG | E3' | E2' | E1a' | E1b' | PP |
| B2 | E1a' | E1b' | PP | A1 | A2 | A3 | E1a | E1b | E2 | PPG | E3/BD1 | BD2 | PG | E3' | E2' |
| B3 | PG | E3' | E2' | E1a' | E1b' | PP | A1 | A2 | A3 | E1a | E1b | E2 | PPG | E3/BD1 | BD2 |
| B4 | PPG | E3/BD1 | BD2 | PG | E3' | E2' | E1a' | E1b' | PP | A1 | A2 | A3 | E1a | E1b | E2 |

TABLE 8-continued

| 5-1-3 cycle (related art) | | | | | | | | | | | | | | |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |
| B5 | E1a | E1b | E2 | PPG | E3/BD1 | BD2 | PG | E3' | E2' | E1a' | E1b' | PP | A1 | A2 | A3 | where:
A1 = First Adsorption Step
A2 = Second Adsorption Step
A3 = Third Adsorption Step
E1a = First (a) Equalization Down Step
E1a = First (a) Equalization Down Step
E2 = Second Equalization Down Step
PPG = Provide Purge Gas Step
E3/BD1 = Third Equalization Down/First Blowdown Overlapping Step
BD2 = Second Blowdown Step
PG = Receive Purge Gas Step
E3' = Third Equalization Up Step
E2' = Second Equalization Up Step
E1a' = First (a) Equalization Up Step
E1b' = First (b) Equalization Up Step
PP1 = First Product Pressurization Step
PP2 = Second Product Pressurization Step Performance comparison for 5-1-3 and 5-1-2 cycles are illustrated using carbon monoxide (CO) coldbox feed in Example 3 and results summarized in Table 9, below.

TABLE 9

Example 3. 5-bed PSA cycles with 3 and 2 pressure equalization steps

| COCB Feed Compositions | 87.1% $H_2$, 12.6% CO, 0.06% $CH_4$, <1% $N_2$, Ar | | |
|---|---|---|---|
| Process Cycle | 5-1-3 (related art) | 5-1-3 (related art) | 5-1-2 (invention) |
| $H_2$ Recovery (%) | 86.8 | 85.2 | 86.7 |
| BSF (ft³/MMscfd) | 190 | 142 | 140 |
| Feed Flux (mol/m²/sec) | 120 | 120 | 120 |
| Purge Time (sec) | 84 | 48 | 119 |
| Feed Time (sec) | 124 | 88 | 119 |
| Cycle Time (min) | 10.3 | 7.3 | 9.9 |

As shown in this Example 3, when the feed composition is the same, the 5-1-2 PSA cycle of the present invention outperforms the 5-1-3 PSA cycle in recovery with smaller BSF. For similar recovery performance of the 5-1-2 cycle, a 5-1-3 cycle requires much larger BSF which acquires longer purge time and cycle time. Therefore, a five bed PSA system devising 5-1-3 cycle is very inefficient in both cost and performance. For intensified PSA design, purge time plays a more important role than pressure equalization steps for achieving target recovery and small BSF.

Further process intensification to improve capital efficiency is demonstrated by devising process cycles of the present invention while utilizing faster rate adsorbents. Tables 10 and 11 show PSA performance impact from adsorbents with higher mass transfer coefficients.

As illustrated in this Example 4 (Table 10, below) the 6-bed PSA having a 6-1-2 PSA cycle with SMR feed is provided. If the adsorbent rate from the baseline is doubled, 1% higher PSA recovery performance is achieved. Further increase adsorbent rate, recovery performance improves but at slower rate.

Furthermore the 5-bed PSA having a 5-1-2 PSA cycle with CO coldbox feed is illustrated in Example 5 (Table 11, below). Fast rate adsorbent enhances PSA recovery performance. Compared to SMR feed 6-bed PSA, the amount of improvement is more incremental. These results are largely contributed by inferior 5-bed process cycle due to limited number of vessels for cycle steps configuration and optimization. In addition, higher CO concentration as limiting species in CO coldbox feed could potentially require even longer purge time to regenerate CO.

TABLE 10

Example 4. Adsorbents MTC impact on 6-bed PSA performance

| SMR Feed Compositions | 74.6% $H_2$, 16.5% $CO_2$, 3.7% CO, 4.5% $CH_4$, <1% $N_2$, $H_2O$ | | |
|---|---|---|---|
| Process Cycle | 6-1-2 (invention) | | |
| Mass Transfer Coefficients (sec⁻¹) | 100% | 200% | 400% |
| $H_2$ Recovery (%) | 85.5 | 86.5 | 87.0 |
| BSF (ft³/MMscfd) | 149 | 148 | 147 |
| Feed Flux (mol/m²/sec) | 140 | 140 | 140 |
| Purge Time (sec) | 115 | 123 | 126 |
| Feed Time (sec) | 70 | 74 | 76 |
| Cycle Time (min) | 7.0 | 7.4 | 7.6 |

TABLE 11

Example 5. Adsorbents MTC impact on 5-bed PSA performance

| COCB Feed Compositions | 87.1% $H_2$, 12.6% CO, 0.06% $CH_4$, <1% $N_2$, Ar | | |
|---|---|---|---|
| Process Cycle | 5-1-2 (invention) | | |
| Mass Transfer Coefficients (sec⁻¹) | 100% | 200% | 400% |
| $H_2$ Recovery (%) | 86.7 | 87.3 | 87.7 |
| BSF (ft³/MMscfd) | 140 | 139 | 138 |
| Feed Flux (mol/m²/sec) | 120 | 120 | 120 |
| Purge Time (sec) | 119 | 123 | 126 |
| Feed Time (sec) | 119 | 123 | 126 |
| Cycle Time (min) | 9.9 | 10.3 | 10.5 |

All process conditions and model results in Examples 1-5 for describing the impacts of process cycles and adsorbent rates on process performance are summarized and plotted in FIGS. 1-2. Recovery validation using pilot plant testing results are provided for 6-1-3, 6-1-2, and 5-1-2 cycles using conventional adsorbents (MTC x1). Pilot-model recovery gap is <1% for CO coldbox feed condition, and ~1.5% for SMR feed condition. This is due to the discrepancy of intrabed thermal dynamics between pilot and model results is more prevalent for the SMR feed condition. Overpredicted temperature swing and heat effects have caused model to breakthrough earlier thus yielding to much lower $H_2$ recovery compared to the pilot results. Nonetheless, this process model is able to predict the impact of process cycles and adsorbent rates on recovery performance, both in trend and in magnitude. From the overall results, it is demonstrated that 6-bed and 5-bed process cycles with less pressure equalization steps perform much better or equivalent at similar BSF numbers. For intensified PSA designs with small BSF, less pressure equalization steps offer the benefits of longer purge time and cycle time to debottleneck PSA working capacity and mitigate fludization risk. Faster rate adsorbents can be used to further enhance recovery performance. The intensified 5-bed and 6-bed PSA systems can achieve up to thirty percent (30%) BSF reduction while meeting the $H_2$ recovery performance.

While the invention has been described in detail with reference to specific embodiment thereof, it will become apparent to one skilled in the art that various changes and modifications can be made, and equivalents employed, without departing from the scope of the appended claims.

What is claimed:

1. A pressure swing adsorption process for producing a gas stream enriched with hydrogen from a feed gas stream utilizing a 5 or 6 adsorbent vessels pressure swing adsorption system, wherein said pressure swing adsorption (PSA) system carries out an efficient process cycle having two pressure equalization steps, no idle step, each pressure equalization and blowdown step being ≥25 seconds, wherein the critical provide purge step is positioned to allow the longest purge time, and the first dedicated provide purge gas is positioned to provide the last purge step for the receiving bed for a clean rinse.

2. The pressure swing adsorption process of claim 1, wherein each pressure equalization step time and blow down step time of the process cycle is equal or greater than 20% of the adsorption/feed step time.

3. The pressure swing adsorption process of claim 1, wherein total purge time is in a range of 20%-30% of the total cycle time for 5-bed PSA system, and in a range of 17%-30% of the total cycle time for 6-bed PSA system.

4. The pressure swing adsorption process of claim 1, wherein the process cycle has a feed flux >100 mol/m²/sec.

5. A pressure swing adsorption process for separating a pressurized supply feed gas containing one or more strongly adsorbable component from at least one less strongly adsorbable product gas component in a six bed adsorption system to produce a continuous stream of product gas enriched in the less strongly adsorbable component and a stream of offgas that is enriched in the strongly adsorbable components, in accordance with to the following cycle chart:

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| B1 | A1 | A2 | A3 | E1 | PPG1 | E2/PPG2 | PPG3 | PPG4 | BD | Pg3a | Pg4 | Pg2 | Pg3b | Pg1 | E2' | E1' | PP1 | PP2 |
| B2 | E1' | PP1 | PP2 | A1 | A2 | A3 | E1 | PPG1 | E2/PPG2 | PPG3 | PPG4 | BD | Pg3a | Pg4 | Pg2 | Pg3b | Pg1 | E2' |
| B3 | Pg3b | Pg1 | E2' | E1' | PP1 | PP2 | A1 | A2 | A3 | E1 | PPG1 | E2/PPG2 | PPG3 | PPG4 | BD | Pg3a | Pg4 | Pg2 |
| B4 | Pg3a | Pg4 | Pg2 | Pg3b | Pg1 | E2' | E1' | PP1 | PP2 | A1 | A2 | A3 | E1 | PPG1 | E2/PPG2 | PPG3 | PPG4 | BD |
| B5 | PPG3 | PPG4 | BD | Pg3a | Pg4 | Pg2 | Pg3b | Pg1 | E2' | E1' | PP1 | PP2 | A1 | A2 | A3 | E1 | PPG1 | E2/PPG2 |
| B6 | E1 | PPG1 | E2/PPG2 | PPG3 | PPG4 | BD | Pg3a | Pg4 | Pg2 | Pg1 | Pg1 | E2' | E1' | PP1 | PP2 | A1 | A2 | A3 | where:
A1 = First Adsorption Step
A2 = Second Adsorption Step
A3 = Third Adsorption Step
E1 = First Equalization Down Step
PPG1 = First Provide Purge Gas Step
E2/PPG2 = Second Equalization Down/Second Provide Purge Gas Overlapping Step
PPG3 = Third Provide Purge Gas Step
PPG4 = Fourth Provide Purge Gas Step
BD = Blowdown Step
Pg3a = Third (a) Receive Purge Gas Step
Pg4 = Fourth Receive Purge Gas Step
Pg2 = Second Receive Purge Gas Step
Pg3b = Third (b) Receive Purge Gas Step
Pg1 = First Receive Purge Gas Step
E2' = Second Equalization Up Step
E1' = First Equalization Up Step
PP1 = First Product Pressurization Step
PP2 = Second Product Pressurization Step.

6. A pressure swing adsorption process for separating a pressurized supply feed gas containing one or more strongly adsorbable component from at least one less strongly adsorbable product gas component in a six bed adsorption system to produce a continuous stream of product gas enriched in the less strongly adsorbable component and a stream of offgas that is enriched in the strongly adsorbable components, in accordance with to the following cycle chart:

|    | 1    | 2          | 3    | 4          | 5    | 6          | 7    | 8          | 9    | 10         | 11   | 12         |
|----|------|------------|------|------------|------|------------|------|------------|------|------------|------|------------|
| B1 | A1   | A2         | E1   | E2/PPG1    | PPG2 | BD         | Pg2a | Pg1        | Pg2b | E2'        | E1'  | PP         |
| B2 | E1'  | PP         | A1   | A2         | E1   | E2/PPG1    | PPG2 | BD         | Pg2a | Pg1        | Pg2b | E2'        |
| B3 | Pg2b | 2          | E1'  | PP         | A1   | A2         | E1   | E2/PPG1    | PPG2 | BD         | Pg2a | Pg1        |
| B4 | Pg2a | Pg1        | Pg2b | E2'        | E1'  | PP         | A1   | A2         | E1   | E2/PPG1    | PPG2 | BD         |
| B5 | PPG2 | BD         | Pg2a | Pg1        | Pg2b | 2          | E1'  | PP         | A1   | A2         | E1   | E2/PPG1    |
| B6 | E1   | E2/PPG1    | PPG2 | BD         | Pg2a | Pg1        | Pg2b | E2'        | E1'  | PP         | A1   | A2         | where:
A1 = First Adsorption Step
A2 = Second Adsorption Step
E1 = First Equalization Down Step
E2/PPG1 = Second Equalization Down/First Provide Purge Gas Overlapping Step
PPG2 = Second Provide Purge Gas Step
BD = Blowdown Step
Pg2a = Second (a) Receive Purge Gas Step
Pg1 = First Receive Purge Gas Step
Pg2b = Second (b) Receive Purge Gas Step
E2' = Second Equalization Up Step
E1' = First Equalization Up Step
PP = Product Pressurization Step.

7. A pressure swing adsorption process for separating a pressurized supply feed gas containing one or more strongly adsorbable component from at least one less strongly adsorbable product gas component in a five bed adsorption system to produce a continuous stream of product gas enriched in the less strongly adsorbable component and a stream of offgas that is enriched in the strongly adsorbable components, in accordance with to the following cycle chart:

|    | 1    | 2    | 3    | 4    | 5    | 6          | 7    | 8          | 9    | 10   | 11   | 12         | 13   | 14   | 15         |
|----|------|------|------|------|------|------------|------|------------|------|------|------|------------|------|------|------------|
| B1 | A1   | A2   | A3   | E1   | PPG1 | E2/PPG2    | PPG3 | BD         | Pg2  | Pg3  | Pg1  | E2'        | E1'  | PP1  | PP2        |
| B2 | E1'  | PP1  | PP2  | A1   | A2   | A3         | E1   | PPG1       | E2/PPG2 | PPG3 | BD  | Pg2        | Pg3  | Pg1  | E2'        |
| B3 | Pg3  | Pg1  | E2'  | E1'  | PP1  | PP2        | A1   | A2         | A3   | E1   | PPG1 | E2/PPG2    | PPG3 | BD   | Pg2        |
| B4 | PPG3 | BD   | Pg2  | Pg3  | Pg1  | E2'        | E1'  | PP1        | PP2  | A1   | A2   | A3         | E1   | PPG1 | E2/PPG2    |
| B5 | E1   | PPG1 | E2/PPG2 | PPG3 | BD | Pg2       | Pg3  | Pg1        | E2'  | E1'  | PP1  | PP2        | A1   | A2   | A3         | where:
A1 = First Adsorption Step
A2 = Second Adsorption Step
A3 = Third Adsorption Step
E1 = First Equalization Down Step
PPG1 = First Provide Purge Gas Step
E2/PPG2 = Second Equalization Down/Second Provide Purge Gas Overlapping Step
PPG3 = Third Provide Purge Gas Step
BD = Blowdown Step
Pg2 = Second Receive Purge Gas Step
Pg3 = Third Receive Purge Gas Step
Pg1 = First Receive Purge Gas Step
E2' = Second Equalization Up Step
E1' = First Equalization Up Step
PP1 = First Product Pressurization Step
PP2 = Second Product Pressurization Step.

8. The pressure swing adsorption process of claim 1, wherein the feed gas stream contains one or more strongly adsorbed component selected from a group consisting of hydrocarbon $CO_2$, CO, Ar, $N_2$, and water vapor.

9. The pressure swing adsorption process of claim 1, wherein each adsorbent bed contains alumina, carbon, and zeolite material configured in layers.

10. The pressure swing adsorption process of claim 9, wherein carbon and zeolite each be layered by different particle sizes to achieve the desired mass transfer rate and pressure drop.

11. The pressure swing adsorption process of claim 9, wherein zeolite has particle sizes from 1.0 mm to 2.0 mm.

12. The pressure swing adsorption process of claim 9, wherein carbon has particle sizes from 1.5 mm to 3.5 mm.

13. The pressure swing adsorption process of claim 9, wherein zeolite mass transfer coefficient for CO is $K_{CO} \geq 10$ sec$^{-1}$.

14. The pressure swing adsorption process of claim 9, wherein zeolite mass transfer coefficient for CO is $K_{CO} \geq 20$ sec$^{-1}$.

15. The pressure swing adsorption process of claim 9, wherein activated carbon mass transfer coefficient for CO is $K_{CO} \geq 7$ sec$^{-1}$.

16. The pressure swing adsorption process of claim 9, wherein activated carbon mass transfer coefficient for CO is $K_{CO} \geq 14$ sec$^{-1}$.

17. The pressure swing adsorption process of claim 1, wherein each pressure equalization step time and blow down step time of the process cycle is in a range of about 20%-35% of the adsorption/feed step time.

18. The pressure swing adsorption process of claim 1, wherein the process cycle has a feed flux in a range of about 120-140 mol/m$^2$/sec.

19. The pressure swing adsorption process of claim 9, wherein zeolite has particle sizes ranging from about 1.0-1.5 mm.

20. The pressure swing adsorption process of claim 9, wherein carbon has particle sizes ranging from about 1.8-3.0 mm.

\* \* \* \* \*